(12) United States Patent
Taylor et al.

(10) Patent No.: US 8,357,238 B2
(45) Date of Patent: Jan. 22, 2013

(54) RAPID CURING WATER RESISTANT COMPOSITION FOR GROUTS, FILLERS AND THICK COATINGS

(75) Inventors: Steven L. Taylor, Glendora, CA (US); Zosimo D. Pamaran, La Mirada, CA (US)

(73) Assignee: Custom Building Products, Inc., Seal Beach, CA (US)

( * ) Notice: Subject to any disclaimer, the term of this patent is extended or adjusted under 35 U.S.C. 154(b) by 44 days.

(21) Appl. No.: 13/079,770

(22) Filed: Apr. 4, 2011

(65) Prior Publication Data

US 2011/0209435 A1 Sep. 1, 2011

Related U.S. Application Data

(63) Continuation-in-part of application No. 12/695,517, filed on Jan. 28, 2010.

(51) Int. Cl.
*C08L 33/00* (2006.01)

(52) U.S. Cl. ........ 106/482; 524/236; 524/247; 524/251; 524/386; 524/492; 525/100; 525/477; 526/319; 526/328; 526/328.5; 526/329.2

(58) Field of Classification Search .......... None
See application file for complete search history.

(56) References Cited

U.S. PATENT DOCUMENTS

| | | |
|---|---|---|
| 3,705,669 A | 12/1972 | Cox et al. |
| 3,706,696 A | 12/1972 | Bernett et al. |
| 3,854,267 A | 12/1974 | Weiant et al. |
| 3,859,233 A | 1/1975 | Barker |
| 3,940,358 A | 2/1976 | Bernett et al. |
| 4,055,529 A | 10/1977 | Burley |
| 4,230,356 A | 10/1980 | O'Connor |
| 4,381,066 A | 4/1983 | Page et al. |
| 4,415,099 A | 11/1983 | Paris |
| 4,472,540 A | 9/1984 | Barker |
| 4,517,375 A | 5/1985 | Schmidt |
| 4,519,174 A | 5/1985 | Witt |
| 4,648,904 A | 3/1987 | DePasquale et al. |
| 4,758,295 A | 7/1988 | Sawaide et al. |
| 4,833,178 A | 5/1989 | Schaefer et al. |
| 4,849,618 A * | 7/1989 | Namikawa et al. ........... 235/493 |
| 4,948,018 A | 8/1990 | Tansley et al. |
| 5,011,713 A | 4/1991 | Lenti et al. |
| 5,216,057 A | 6/1993 | Pratt et al. |
| 5,274,159 A | 12/1993 | Pellerite et al. |
| 5,505,344 A | 4/1996 | Woods |
| RE36,042 E | 1/1999 | Landy et al. |
| 5,866,641 A | 2/1999 | Ronden et al. |
| 6,037,429 A | 3/2000 | Linert et al. |
| 6,251,984 B1 | 6/2001 | Shimada et al. |
| 6,271,289 B1 | 8/2001 | Longoria et al. |
| 6,284,077 B1 | 9/2001 | Lucas et al. |
| 6,291,536 B1 | 9/2001 | Taylor |
| 6,309,493 B1 | 10/2001 | Braun et al. |
| 6,333,365 B1 | 12/2001 | Lucas et al. |
| 6,395,794 B2 | 5/2002 | Lucas et al. |
| 6,414,044 B2 | 7/2002 | Taylor |
| 6,464,770 B1 | 10/2002 | Palm et al. |
| 6,478,561 B2 | 11/2002 | Braun et al. |
| 6,545,068 B1 | 4/2003 | Simmons et al. |
| 6,569,939 B2 * | 5/2003 | Eck et al. ..................... 524/588 |
| 6,596,074 B2 | 7/2003 | Pomeroy |
| 7,005,462 B2 | 2/2006 | Schad et al. |
| 7,241,828 B2 | 7/2007 | Kyte et al. |
| 2002/0195025 A1 | 12/2002 | Bacher et al. |
| 2003/0029132 A1 | 2/2003 | Ward |
| 2003/0129419 A1 | 7/2003 | Chen |
| 2005/0065240 A1 | 3/2005 | Kyte et al. |
| 2005/0065256 A1 | 3/2005 | Kyte et al. |
| 2005/0197437 A1 | 9/2005 | Kyte et al. |
| 2007/0172658 A1* | 7/2007 | Deruelle et al. ............. 428/405 |

FOREIGN PATENT DOCUMENTS

| | | |
|---|---|---|
| EP | 1403226 A1 * | 3/2004 |
| WO | 2005056489 A1 | 6/2005 |
| WO | 2006036778 A2 | 4/2006 |

OTHER PUBLICATIONS

Product data sheet for Rhoximat DS 931.*
Product data sheet for Wacker BS45.*
Machine-generated translation of EP 1403226 into English (no date).*
BASF Corporation, "Acronale® NX 4787 X: Aqueous Co-Polymer Dispersion for the Manufacture of Ceramic Tile Adhesives, Primers and Other Construction Adhesives", Technical Information Brochure XP-002631874, Oct. 2003, BASF Corporation, Charlotte, NC.
ISA/EPO, International Search Report for PCT International Application No. PCT/US2010/062228 dated Apr. 20, 2011.

* cited by examiner

*Primary Examiner* — Marc Zimmer
(74) *Attorney, Agent, or Firm* — Fulwider Patton LLP

(57) ABSTRACT

A premixed composition is formed from modified polyacrylate polymer, silicone emulsion, one or more amine compounds, and silane, that cures rapidly to form a composition that can be used as a grout or coating. The premixed composition includes a latex resin including an acrylic-based polymer, a silicone emulsion, one or more amine compounds, and a silane, and optionally various fillers, pigments, and adjuvants. These components in the proper proportions form a stable viscous suspension that can be floated into tile joints, and cleaned from an adjacent tile surface. The composition rapidly cures to form a hard mass that is resistant to abrasion, in both dry and wet conditions, is color consistent, and is resistant to staining.

18 Claims, 2 Drawing Sheets

RAPID CURING WATER RESISTANT COMPOSITION FOR GROUTS, FILLERS AND THICK COATINGS

CROSS-REFERENCES TO RELATED APPLICATIONS

This application is a continuation-in-part of U.S. application Ser. No. 12/695,517, filed Jan. 28, 2010, which is incorporated by reference in its entirety.

BACKGROUND OF THE INVENTION

The present invention relates generally to compositions that can be used for grouting of tile and the like, and as fillers and thick coatings for use with other types of building materials, and more particularly relates to rapid curing premixed compositions containing a rapid curing acrylic-based polymer, a silicone emulsion, and a silane, that can be used as grout, filler or thick coating.

Tile installation commonly involves grouting of the tile with a water-based cementitious grout typically prepared by mixing a cementitious powder with water immediately prior to application of the grout. Mixing of the cementitious powder with water is typically messy, and the success of the grouting application is highly dependent upon using the correct proportions of cementitious powder and water, and the proper amount of mixing and "slaking" time. Slaking involves allowing the mixture to rest before a final mixing so that the water can thoroughly penetrate and chemically combine with the cementitious powder and other elements (e.g. dyes, pigments, binders, solids, etc.) causing the powder and various elements to become wetted and to better develop. Furthermore, obtaining acceptable color uniformity with cementitious grouts is commonly a major challenge, since cementitious grouts are prone to efflorescence, typically a buildup of a visible, white powdery substance at the surface of grout joints, and since the final cured color of a grout is sensitive to absorption by tile and substrates, as well as environmental and weather conditions. Additionally, cementitious grouts commonly have poor stain resistance, and must be treated with topical sealers to resist staining.

Premixed grouts are typically more convenient to use than cementitious grouts, since they come ready to use and do not need to be mixed with water or other components prior to use. Accordingly, application time can be reduced with wetting, mixing, and slaking steps eliminated. Premixed grouts are especially beneficial for color consistency and stain resistance. However, conventional premixed grouts do not harden as fast as cementitious grouts, and often require many days to cure properly.

One known tile grout composition is a water-based epoxy grout composition that employs a water dispersible epoxy polymer and a water compatible polyamine epoxy resin adduct as a curing agent in combination with a water repellent component. Another known grout composition includes naturally rounded colored quartz particles and a water-borne polyurethane. Another known polymer composition for flexibilizing building materials includes a water-insoluble, film-forming polymer of one or more ethylenically unsaturated monomers capable of free radical polymerization, a water-soluble polymer of one or more ethylenically unsaturated monomers capable of free radical polymerization, along with ionic and nonionic emulsifiers, and a mixture of at least two organosilicon compounds.

A fast hardening aqueous coating composition and paint is also known, including about 95-99 percent by weight of an anionically stabilized aqueous emulsion of a copolymer having a Tg of from about 0° C. to about 40° C., about 0.2 to about 5 percent by weight of a polyimine; and about 0.2 to about 5 percent by weight of a volatile base. Also known are aqueous silicone dispersions that are crosslinkable into an elastomeric state on removal of water, for the production of elastomeric silicone seals. A shelf-stable fast-cure aqueous coating is also known that contains an anionically stabilized latex, a polyfunctional amine and a volatile base in an amount sufficient to deprotonate the conjugate acid of the amine.

Moisture resistance is a key performance attribute of tile grouts, such that they can be used in showers, tub surrounds, kitchens and other areas with intermittent or continual wetness. There remains a need for rapid curing compositions that attain sufficient ultimate hardness and moisture resistance for use in grouting of tile and the like, and as fillers and thick coatings for use with other types of building materials. It is therefore desirable to provide compositions that can be used for grouting of tile and the like, and as fillers and thick coatings for use with other types of building materials, that cure rapidly and attain an improved ultimate hardness and moisture resistance.

Another key performance attribute of tile grouts is "cleanability." Typically following application of grout between adjacent tiles in a tile assembly comprising a plurality of tiles (typically arranged in a geometric pattern), even after the grout has been smoothed and excess grout has been removed from the edges of the tiles, a thin residue of grout will remain on the surface of the tiles that must be cleaned from the tile surface before the applied grout completely dries and sets. If this thin residue of grout cannot be cleaned from the surface of the tiles before the thin residue of grout completely dries and sets, the thin residue of grout will become a dirty film on the surface of the tiles that can be extremely difficult to remove without damaging the tiles. While cleanability with respect to grout can be used to refer to how easily grout can be cleaned of soil or stains after it has completely dried and set, as used herein, the term cleanability refers to how easily and completely a residue of a grout composition can be removed from a tile surface following application between tiles (which inevitably results in some undesirable residual application to the tile surfaces) and before the grout composition completely dries and sets, without removing the grout composition from between adjacent tiles in a tile assembly. In this context, good cleanability means that, following application of a grout composition to a tile assembly, the grout composition can be cleaned thoroughly and easily from the tile surface without removing the grout composition from a grout line formed by the grout composition between adjacent tiles in the tile assembly. It would be desirable to provide premixed compositions that can be used for grouting of tile and the like with an improvement in this type of cleanability, which can be critical when premixed compositions also have rapid curing properties, which inevitably correlates with an increased tendency by such compositions to adhere more strongly to tile surfaces. The present invention meets these and other needs.

SUMMARY OF THE INVENTION

Briefly, and in general terms, the present invention provides for a premixed composition formed from modified polyacrylate polymer, silicone emulsion, and silane that, when acting together, cure rapidly to form a composition that can be used as a grout or coating that rapidly attains an ultimate desired hardness. In addition, the composition attains improved moisture resistance and improved cleanability.

Accordingly, the present invention provides for a premixed composition including a latex resin including an acrylic-based polymer, a silicone emulsion, and a silane, and optionally various fillers, pigments, and adjuvants. These components in the proper proportions form a stable viscous suspension that can be floated into tile joints, and cleaned from an adjacent tile surface. The composition rapidly cures to form a hard mass that is resistant to abrasion, in both dry and wet conditions, is color consistent, and is resistant to staining. In one presently preferred aspect, the composition has a Shore D hardness of at least 20 after a one-day dry cure, and Shore D hardness of at least 18 after being subjected to immersion in water for one day following a one-day dry cure. In another presently preferred aspect, the composition has a Shore D hardness of at least 40 after a three-day dry cure, and Shore D hardness of at least 35 after being subjected to immersion in water for one day following a three-day dry cure. In another presently preferred aspect, the composition has a Shore D hardness of at least 60 after a seven-day dry cure, and a Shore D hardness of at least 50 after being subjected to immersion in water for one day following a seven-day dry cure. (See Table 7.)

In a presently preferred aspect, the composition includes approximately 15-25 percent by weight of a latex resin such as a fast cure latex resin having a glass transition temperature (Tg) above 25° C., approximately 1.5-3.5 percent by weight of a silicone emulsion, approximately 0.15 to 0.25 percent by weight of a silane, approximately 0.8 to 1.0 percent by weight ethylene glycol, and approximately 72 to 80 percent by weight sand, or more preferably approximately 74 to 77 percent by weight sand. The optimum sand amount may be determined by its packing density, which is mostly controlled by the gradation in size and shape of the sand. More preferably, the composition includes approximately 18-20 percent by weight of the latex resin, and approximately 2.0-2.8 percent by weight of the silicone emulsion.

In a presently preferred aspect, the latex resin component of the composition includes a polymer obtained by co-polymerization of styrene, alkyl(meth)acrylate and other copolymerizable monomers, where the alkyl group of the acrylate monomer can be methyl, ethyl, propyl, butyl or higher alkyl groups. The latex of the present invention has superior drying characteristics which are well described in U.S. Pat. No. 6,376,574, incorporated by reference herein, and in which the hardening characteristics of different latexes are shown in Table 1. More preferably, the latex polymer includes a copolymer of styrene and butylacrylate, optionally with a minor amount of another copolymerizable monomer. In order to obtain a high Tg latex polymer with rapid curing and hardness characteristics, the styrene monomer is preferable. The styrene content may be in the range of zero to about 70 percent by weight of the latex resin polymer.

In another presently preferred aspect, the silicone emulsion can include approximately 30 to 60 percent by weight of a siloxane, such as polymethylethoxy siloxane, and approximately 1 to 5 percent by weight of an alkylalkoxy silane, such as octyl triethoxy silane, with a remainder of ethanol, for example, although other similar silicone emulsions can also be suitable.

In another presently preferred aspect, the silane can include alkylalkoxy silane, optionally with a fluoropolymer, or alternatively can include an alkylalkoxy silane optionally with hydroxyl polyglycolether, or an organic solvent such as alkoxyethanol acetate and ethanol, for example, although other similar silanes can also be suitable.

In a presently preferred embodiment, the present invention provides for a premixed composition suitable for use as a grout or coating, including a latex resin having a glass transition temperature (Tg) above 25° C., a silicone emulsion, a silane, one or more amine compounds, and sand. In a presently preferred aspect, the composition is greater than 95% cleaned from tile following application between or to the tile after 10 minutes drying time by less than 5 cycles of a brush abrasion machine. In another presently preferred aspect, the one or more amine compounds have 3-5 carbon atoms per amine group. In another presently preferred aspect, the pne or more amine compounds includes alkanolamine. In another presently preferred aspect, the one or more amine compounds includes a primary amine having a primary amine group attached to a secondary or tertiary carbon atom. In another presently preferred aspect, the one or more amine compounds have 1 wt. %-10 wt. % of dry latex resin weight. In another presently preferred aspect, the one or more amine compounds are selected from the group consisting of 2-Amino-2-Methyl-1-Propanol, 1-Amino-2-Propanol, 2-Amino-1-Propanol, Cyclopentylamine, 2-Amino-3-Methyl-Butanol, and combinations thereof. In this embodiment, the method of grouting tile involves applying the premixed composition in spaces between a plurality of tiles installed on a substrate surface; and allowing the premixed composition to dry to cure.

These and other aspects and advantages of the invention will become apparent from the following detailed description, which illustrates by way of example the features of the invention.

BRIEF DESCRIPTION OF THE DRAWINGS

FIG. 4 is a schematic diagram illustrating a top view of a set-up for a sample substrate that the cleanability testing apparatus shown in FIG. 3 acts on.

DETAILED DESCRIPTION OF THE PREFERRED EMBODIMENTS

Figure 1:
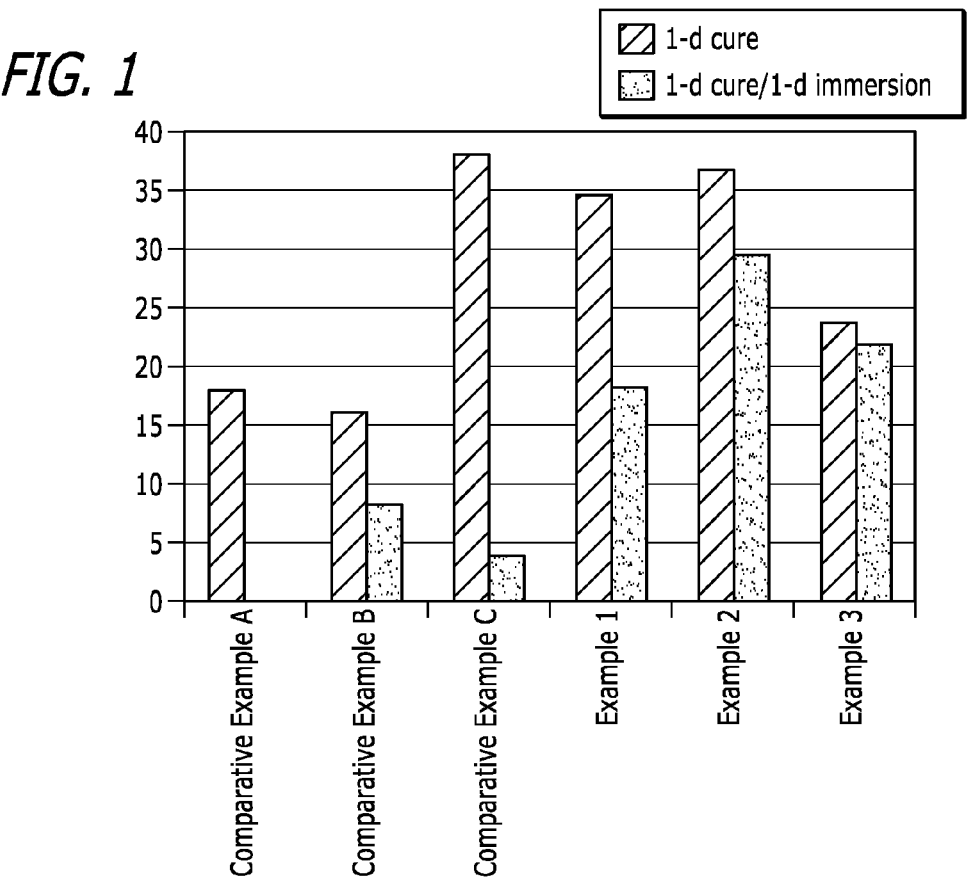
FIG. 1 is a bar graph depicting the Shore D hardness results of 1-day cure and 1-day cure with 1-day immersion for six different samples.

The premixed composition of the present invention advantageously includes a latex resin, a silicone emulsion, and a silane. The latex resin preferably has a glass transition temperature (Tg) above 25° C. The glass transition temperature can be measured by thermal method (e.g. DSC) or thermomechanical method (e.g. TMA), which is known in the prior art. The latex resin component of the composition preferably includes a polymer obtained by co-polymerization of styrene, alkyl(meth)acrylate and other copolymerizable monomers. More preferably, the latex polymer includes a copolymer of styrene and butylacrylate, optionally including a minor amount of another similar copolymerizable monomer, such as is well known in the art. In order to obtain high Tg latex polymer, styrene content may be in the range of zero to about 70 percent by weight of the polymer. The alkyl group of the acrylate monomer can be, methyl, ethyl, propyl, butyl or higher alkyl groups. The butyl group is the most commonly used in the fast curing latex composition. The latex content in the composition of the present invention is approximately 15 to 25 percent by weight as a latex resin, typically provided as approximately 40 to 60 percent by weight solid latex, where the filler content in the premixed composition of the present invention is typically approximately 76 to 85 percent by weight. More preferably, the latex resin content is approximately 18 to 20 percent by weight of the composition of the present invention. One such presently preferred latex resin is a latex resin commercially available under such brand names as HD-21A from Rohm & Haas, or DT-250 from Dow Chemical, containing approximately 45.0 to 55.0 percent by weight of acrylic polymer(s) or a styrene-acrylate based polymer.

The silicone emulsion can include approximately 30 to 60 percent by weight polymethylethoxy siloxane and approximately 1 to 5 percent by weight alkylalkoxy silane, for example, although other similar silicone emulsions can also be suitable. The presently preferred range of the silicone emulsion, which typically has 40-50 solid weight % content, is 1.5-3.5 percent by weight in the composition of the present invention, more preferably 2.0-2.8 percent by weight. Too much of the silicone emulsion may delay curing, whereas an insufficient amount of the emulsion limits water resistance of the cured composition. One such presently preferred silicone emulsion is available under the brand name SILRES BS 45 from Wacker, containing an alkylsilicone resin emulsion in water, and more particularly containing approximately 30 to 60 percent by weight polymethylethoxysiloxane and approximately 1 to 5 percent by weight octyltriethoxy silane, with a trace amount of ethanol, for example, although other similar silicone emulsions can also be suitable.

The silane can include an alkylalkoxy silane water dispersion, optionally with a fluoropolymer; or alternatively, the silane can include alkylalkoxy silane optionally with hydroxy polyglycolether, alkoxyethanol acetate, with a remainder of an organic solvent, such as ethanol, for example, although other similar silanes can also be suitable. One such presently preferred silane is an alkylalkoxy silane with fluoropolymer dispersion in water available under the brand name SILRES BS 29A from Wacker.

The composition of the present invention also preferably contains approximately 72 to 80 percent by weight sand, or more preferably approximately 74 to 77 percent by weight sand, and can contain approximately 0.8 to 1.0 percent by weight ethylene glycol. The optimum amount of sand may be determined by the packing density of the sand, which is mostly controlled by the gradation in size and shape of the sand. The composition of the present invention may also optionally include other minor ingredients, such as a deodorant to mask any ammonia smell from the fast curing latex, as well as various fillers, pigments, thickeners, and adjuvants, such as, for example, approximately 0.2 percent by weight of a silicone defoamer; approximately 0.07 to 0.1 percent by weight of a surfactant, such as nonylphenol polyethoxylate; approximately 0.04 percent by weight of preservative and biocide; approximately 0.015 percent by weight of a rheology modifier and thickener, such as hydroxyethyl methyl cellulose; and approximately 0.5 to 0.6 percent by weight of an acrylic-based thickener, for example. Other similar fillers, pigments, thickeners, and adjuvants may also be suitable. The unexpected, surprising improvements provided by the compositions according to the invention are illustrated in the following detailed comparative examples presented for purposes of comparison, and as examples of preferred embodiments according to the invention.

TABLE 1

COMPARATIVE EXAMPLES

|  | Example A (parts by weight) | Example B (parts by weight) | Example C (parts by weight) |
| --- | --- | --- | --- |
| Synthomer RAVACRYL 473 | 188 | 188 |  |
| Rohm & Haas HD-21A |  |  | 188 |
| Wacker SILRES BS 45 |  | 22 |  |
| Wacker SILRES BS 29A | 2.5 | 2.5 | 2.5 |
| Defoamer | 2.5 | 2.5 | 2 |
| Non-ionic surfactant | 2.7 | 2.7 | 1 |
| Ethylene glycol | 14 | 14 | 10 |
| Biocide and preservative | 0.43 | 0.43 | 0.43 |
| Water | 3.5 | 3.5 |  |
| Cellulose ether thickener |  |  | 0.15 |
| #70 sand | 750 | 750 | 750 |
| Acrylic thickener | 1.2 | 3.5 | 7 |
| Total | 966.23 | 990.53 | 961.08 |

TABLE 2

RELATIVE SHORE D HARDNESS (DUROMETER-D)

| Cure Time (days) | Example A | Example B | Example C |
| --- | --- | --- | --- |
| 1 | 18 | 16 | 38 |
| 3 | 30 | 32 | 46 |
| 5 | 35 | 33 | 66 |
| 7 | 35 | 35 | 69 |
| 15 | 40 | 36 | 69 |
| 30 | 40 | 36 | 71 |

TABLE 3

RELATIVE SHORE D HARDNESS WITH WATER IMMERSION (DUROMETER - D)

|  | Example A | Example B | Example C |
| --- | --- | --- | --- |
| 1 Day Dry Cure | 18 | 16 | 38 |
| 1 Day Dry Cure/ 1 Day Water Immersion | 0 | 8 | 4 |
| 3 Day Dry Cure | 30 | 32 | 36 |
| 3 Day Dry Cure/ 1 Day Water Immersion | 8 | 22 | 30 |
| 7 Day Dry Cure | 36 | 35 | 69 |
| 7 Day Dry Cure/ 1 Day Water Immersion | 18 | 28 | 44 |

TABLE 4

STAIN RESISTANCE

| Staining Agents | Example A | Example B | Example C |
| --- | --- | --- | --- |
| Coffee | 1 | 1 | 1 |
| Coke | 0 | 0 | 0 |
| Red wine | 0 | 0 | 0 |
| Soy sauce | 0 | 0 | 0 |
| Ketchup | 0 | 0 | 0 |
| Mustard | 1 | 0 | 0 |
| Vegetable oil | 0 | 0 | 0 |
| Total score | 2 | 1 | 1 |

(Rating (0-4): 0-No stain; 1-Very light; 2-Light; 3-Medium; 4-Heavy)

TABLE 5

EXAMPLES OF PREFERRED EMBODIMENTS

|  | Example 1 (parts by weight) | Example 2 (parts by weight) | Example 3 (parts by weight) |
| --- | --- | --- | --- |
| Rohm & Haas HD-21A | 188 | | |
| Dow Chemical DT-250NA | | 188 | 216 |
| Wacker SILRES BS 45 | 22 | 22 | 25.5 |
| Wacker SILRES BS 29A | 2 | 1.75 | 2.3 |
| Defoamer | 2 | 2 | |
| Non-ionic surfactant | 1 | 1 | 0.75 |
| Ethylene glycol | 10 | 10 | 8 |
| Biocide and preservative | 0.43 | 0.43 | 0.43 |
| Cellulose ether thickener | 0.15 | 0.15 | 0.15 |
| #70 sand | 750 | 750 | 760 |
| Acrylic thickener | 6 | 5 | 6 |
| Total | 981.58 | 980.33 | 1019.13 |

TABLE 6

RELATIVE SHORE D HARDNESS (DUROMETER - D)

| Cure Time (days) | Example 1 | Example 2 | Example 3 |
| --- | --- | --- | --- |
| 1 | 35 | 37 | 24 |
| 3 | 48 | 52 | 50 |
| 5 | 65 | 68 | 68 |
| 7 | 68 | 72 | 72 |
| 15 | 68 | 75 | 72 |
| 40 | 70 | 76 | 73 |

TABLE 7

RELATIVE SHORE D HARDNESS WITH WATER IMMERSION (DUROMETER - D)

| | Example 1 | Example 2 | Example 3 |
| --- | --- | --- | --- |
| 1 Day Dry Cure | 35 | 37 | 24 |
| 1 Day Dry Cure/ 1 Day Water Immersion | 18 | 30 | 22 |
| 3 Day Dry Cure | 48 | 52 | 50 |
| 3 Day Dry Cure/ 1 Day Water Immersion | 48 | 49 | 43 |
| 7 Day Dry Cure | 68 | 72 | 72 |
| 7 Day Dry Cure/ 1 Day Water Immersion | 59 | 67 | 64 |

TABLE 8

STAIN RESISTANCE

| Staining Agents | Example 1 | Example 2 | Example 3 |
| --- | --- | --- | --- |
| Coffee | 1 | 1 | 0 |
| Coke | 0 | 0 | 0 |
| Red wine | 0 | 0 | 0 |
| Soy sauce | 0 | 0 | 0 |
| Ketchup | 0 | 0 | 0 |
| Mustard | 0 | 0 | 0 |
| Vegetable oil | 0 | 0 | 0 |
| Total score | 1 | 1 | 0 |

(Rating (0-4): 0-No stain; 1-Very light; 2-Light; 3-Medium; 4-Heavy)

In the foregoing Comparative Examples A-C, and Examples 1-3, grout compositions were prepared by mixing the ingredients listed in Tables 1 and 5, and were tested by application of the grout compositions to tile installed on a backerboard by inserting the grout composition in spaces between the tiles according to standard techniques, and allowing the applied grout compositions to dry for different periods of time, and then testing for relative hardness on the Shore Durometer (D) scale, as indicated in Tables 2 and 6. The samples were also tested for relative hardness for different periods of drying time and with and without immersion in water, as indicated in Tables 3 and 7. The samples were rated for stain resistance after 4 hours of stain dwell time, and after being brushed clean with water only, and allowed to dry. The samples were tested for stain resistance on a subjective relative scale of zero to 4, with the following ratings: 0—No stain; 1—Very light; 2—Light; 3—Medium; 4—Heavy.

Figure 2:
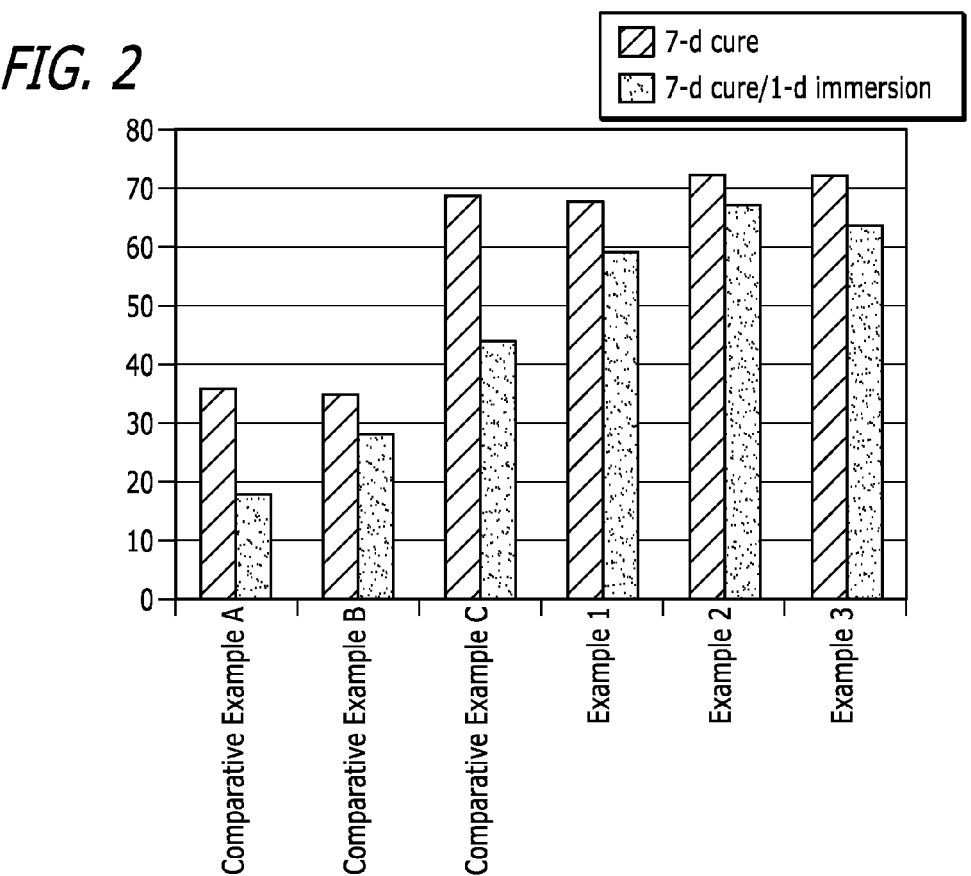
FIG. 2 is a bar graph depicting the Shore D hardness results of 7-day cure and 7-day cure with 1-day immersion for six different samples.

It can be seen from the foregoing examples in Tables 2 and 6 that the compositions of Examples 1-3 according to the invention showed surprising improvement of hardness over the Comparative Examples A-C after drying and curing only, and from Tables 4 and 8 that the Compositions of Examples 1-3 according to the invention showed improved stain resistance over the Comparative Examples A-C. However, it can be seen from Tables 3 and 7 (and FIGS. 1 and 2) that the compositions of Examples 1-3 according to the invention unexpectedly showed a dramatic improvement of hardness over the Comparative Examples A-C, after drying and curing for one day, followed by immersion in water for a period of one day; after drying and curing for three days, followed by immersion in water for a period of one day; and after drying and curing for seven days, followed by immersion in water for a period of one day. The properties of rapid curing and resistance to water are critically important for compositions and coatings that are subjected to exposure to water, such as by immersion, splashing or condensation, for example. The premixed composition of the present invention preferably has a Shore D hardness of at least 20 after a one-day dry cure, and a Shore D hardness of at least 18 after being subjected to immersion in water for one day following a one-day dry cure; a Shore D hardness of at least 40 after a three-day dry cure, and a Shore D hardness of at least 35 after being subjected to immersion in water for one day following a three-day dry cure; and a Shore D hardness of at least 60 after a seven-day dry cure, and a Shore D hardness of at least 50 after being subjected to immersion in water for one day following a seven-day dry cure.

In another aspect, the present invention provides for improved cleanability of the premixed composition provided herein, particularly when used as grout, including an amine compound or combination of amines in the premixed compositions of the present invention. As used herein, good cleanability means that upon applying the grout composition to a tile assembly, the grout composition can be cleaned thoroughly and easily from the tile surface without removing the grout composition from a grout line formed by the grout composition between tiles. The improvement of cleanability is critical to the present invention, because the rapid curing premixed compositions of the present invention inevitably have a tendency to strongly adhere to the tile surface. The inventors surprisingly discovered that a certain type of amine or a combination of the amines improve cleanability of the premixed compositions when used for grouting of tile, and prolong the time in which the grout composition is cleanable from tile, with a minimum impact on the hardening and rapid curing of the grout composition.

Figure 3:
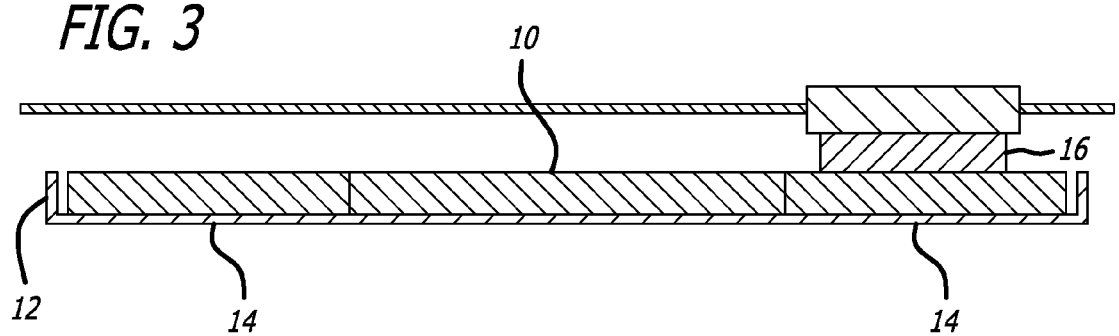
FIG. 3 is a schematic diagram illustrating an elevational view of the apparatus for testing cleanability properties of an embodiment of a premixed composition according to the present invention.
Figure 4:
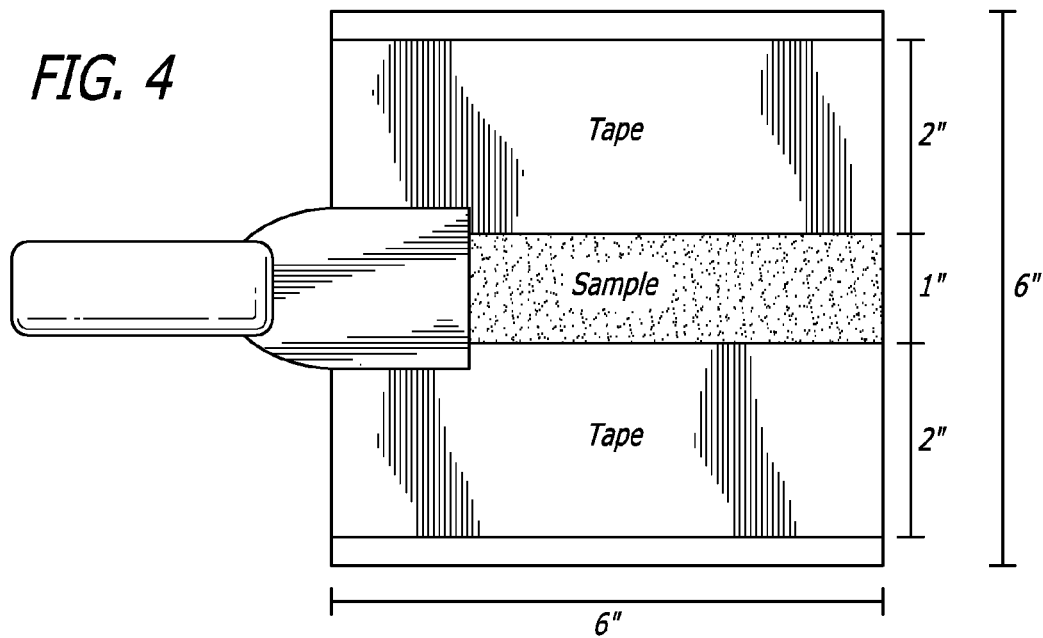

The amines included in the premixed compositions of the invention and tested were 2-Amino-2-Methyl-1-Propanol or AMP (Example 4), 1-Amino-2-Propanol (Example 5), 2-Amino-1-Propanol (Example 6), Cyclopentylamine (Example 7), 2-Amino-3-Methyl-Butanol (Example 8). In order to demonstrate the benefit of the amine additive, a tile cleaning test method was devised, which is illustrated in FIGS. 3 and 4. A Model AG-8100 BYK-Gardener Abrasion Tester was used along with a nylon brush attachment 16 (AG-8112) to perform the cleanability tests. The sample 10 was placed into the sample tray 12 along with two other pieces of 0.5" thick quarry tile serving as spacer tiles 14. These pieces would keep the sample tile centered and maintain a constant height across the entire stroke. After the designated time (10 minutes for instance), water was poured over the entire sample and allowed to sit for 30 seconds, and then the machine was run. When approximately 95% or more of the sample appeared to be cleaned from the tile, the machine was turned off, and the number of cycles on the counter was recorded.

In order to determine the effectiveness of the amine cleanability improvement component, the following basic formulation was employed (Table 6), in which a variety of amines were tested.

TABLE 9

| Chemical | Weight (g) |
| --- | --- |
| Amine additive | 1.5 |
| Fast curing latex (Dow Chemical DT-250NA) | 188 |
| Defoamer | 2 |
| Nonionic surfactant | 1 |
| Ethylene glycol | 15 |
| Cellulose ether thickener | 0.15 |
| #70 sand | 750 |
| Total | 957.65 |

A basic version of the premixed composition was made by using a mixer utilizing a 3-propeller blade. The basic composition is shown in Table 9. Each component was mixed in every minute in the order shown in Table 1 and mixed at 175 rpm. With the addition of sand, the mixing rpm was increased to 475. Mixing stopped when there were no more lumps. At this point a selected amine additive was mixed in by hand along with more ethylene glycol.

For purposes of providing comparisons with control amine additives, Triethanolamine or TEA (Comparative example D), N-Phenyldiethanolamine (Comparative example E), 2-Amino-1-phenylethanol (Comparative example F) were selectively added and mixed in the basic composition for testing. A control sample with no amine additive was also tested.

A piece of 6"×6"×0.5" Old Towne Quarry tile from Summitville Tiles Inc. was used as the substrate for the entire study. As illustrated in FIG. 4, a length of approximately 2" wide painter's tape, which measured to be 5 mils thick, was effectively used as a thickness spacer for the sample. A 1" wide gap was created between the two pieces of the tape adhered to the tile. The sample was then applied using a 1.5" flat edge (modified paring knife). Using the tape as a thickness guide, the paring knife was then run across the tape to remove excess sample and leave a 5 mil film. This motion was repeated 3 times. The timer was then started. The tape was then removed. At 10 minutes, the cleanability testing was conducted, as illustrated in FIG. 3.

Table 10 shows the cleanability test results. The control sample with no amine additive showed essentially no cleanability, in that the grout composition had hardened sufficiently within a period of 10 minutes that substantially none of the sample could be removed by the apparatus, after 50 cleaning strokes of the test apparatus. Testing of the comparative control samples was stopped at 50 cycles of cleaning strokes of the test apparatus if there was no improvement over the control sample with no amine additive. AMP (2-Amino-2-Methyl-1-Propanol), and 2-Amino-1-Propanol were cleaned within 3 cycles of cleaning strokes of the test apparatus; and 1-Amino-2-Propanol was cleaned within 5 cycles of cleaning strokes of the test apparatus. The premixed composition samples including the amine additives of the invention were considered to be essentially 100% cleaned, although a slight film residue remained, since testing was stopped when approximately 95% or more of the sample appeared to be cleaned from the tile, so that this was deemed to be acceptable for purposes of testing of the samples.

TABLE 10

Results from the cleanability experiment

| Example | Sample Name | Time (min) | # of Cycles | % Cleanliness |
| --- | --- | --- | --- | --- |
| Ref. | Control (without amine) | 10 | 50 | 0% |
| Example 4 | 2-Amino-2-Methyl-1-Propanol (AMP) | 10 | 3 | 100% |
| Example 5 | 1-Amino-2-Propanol | 10 | 5 | 100% |
| Example 6 | 2-Amino-1-Propanol | 10 | 3 | 100% |
| Example 7 | Cyclopentylamine | 10 | 50 | <50% |
| Example 8 | 2-Amino-3-Methyl-Butanol | 10 | 50 | <30% |
| Comparative Example D | Tri-ethanolamine (TEA) | 10 | 50 | <5% |
| Comparative Example E | N-Phenyldiethanolamine | 10 | 50 | 0% |
| Comparative Example F | 2-Amino-1-phenylethanol | 10 | 50 | 0% |

According to the results, an additive amine compound having three to five carbon atoms per one amine group was found to substantially improve cleanability of the premixed compositions of the present invention. More preferably, an additive amine having both an amine group and an alcohol group is effective to improve cleanability of the premixed compositions of the present invention.

The mechanism of the cleanability improvement is not known, but it is believed that the amine works on the latex resin component and prevents the latex resin component from becoming rapidly strongly adhered to tile surface, without preventing the coalescence of the premixed compositions because of its compatibility with the latex resin component.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A premixed composition suitable for use as a grout or coating, comprising:
   a latex resin having a glass transition temperature (Tg) above 25° C.;
   a silicone emulsion;
   a silane;
   one or more amine compounds; and
   sand, wherein said composition is greater than 95% cleaned from a tile following application to or near the tile after 10 minutes drying time by less than 5 cycles of a brush abrasion machine.

2. The premixed composition of claim 1, wherein said one or more amine compounds have 3-5 carbon atoms per amine group.

3. The premixed composition of claim 2, wherein said one or more amine compounds comprises alkanolamine.

4. The premixed composition of claim 2, wherein said one or more amine compounds comprises a primary amine having a primary amine group attached to a secondary or tertiary carbon atom.

5. The premixed composition of claim 1, wherein said one or more amine compounds are 1 wt. %-10 wt. % of dry latex resin weight.

6. The premixed composition of claim 1, wherein said latex resin comprises a polymer obtained by co-polymerization of one or more of (i) styrene and (ii) an acrylate monomer, together with another copolymerizable monomer.

7. The premixed composition of claim 6, wherein said latex resin comprises a copolymer of styrene, said copolymer having up to 70 percent styrene by weight.

8. The premixed composition of claim 6, wherein said latex resin comprises said acrylate monomer and said acrylate monomer is butylacrylate.

9. A premixed composition suitable for use as a grout or coating, comprising:
   a latex resin having a glass transition temperature (Tg) above 25° C.;
   a silicone emulsion;
   a silane;
   one or more amine compounds; and
   sand, wherein said one or more amine compounds are selected from the group consisting of 2-Amino-2-Methyl-1-Propanol, 1-Amino-2-Propanol, 2-Amino-1-Propanol, Cyclopentylamine, 2-Amino-3-Methyl-Butanol, and combinations thereof.

10. A premixed composition suitable for use as a grout or coating, comprising:
    a latex resin having a glass transition temperature (Tg) above 25° C.;
    a silicone emulsion;
    a silane;
    one or more amine compounds; and
    sand, wherein said silicone emulsion comprises 30 to 60 percent by weight of polymethylethoxy siloxane.

11. A premixed composition suitable for use as a grout or coating, comprising:
    a latex resin having a glass transition temperature (Tg) above 25° C.;
    a silicone emulsion;
    a silane;
    one or more amine compounds; and
    sand, wherein said silane comprises alkylalkoxy silane.

12. A premixed composition suitable for use as a grout or coating, comprising:
    a latex resin having a glass transition temperature (Tg) above 25° C.;
    a silicone emulsion;
    a silane;
    one or more amine compounds; and
    sand, wherein said premixed composition has:
    a Shore D hardness of at least 20 after a one-day dry cure, and
    a Shore D hardness of at least 18 after being subjected to immersion in water for one day following a one-day dry cure; and
    a Shore D hardness of at least 40 after a three-day dry cure, and
    a Shore D hardness of at least 35 after being subjected to immersion in water for one day following a three-day dry cure; and
    a Shore D hardness of at least 60 after a seven-day dry cure, and
    a Shore D hardness of at least 50 after being subjected to immersion in water for one day following a seven-day dry cure.

13. A method of grouting tile, comprising the steps of:
    providing a premixed composition, comprising:
    a) a latex resin having a glass transition temperature (Tg) above 25° C.,
    b) a silicone emulsion,
    c) a silane,
    d) one or more amine compounds, and
    e) sand;
    applying the premixed composition in spaces between a plurality of tiles installed on a substrate surface; and
    allowing the premixed composition to dry to cure, wherein said composition is greater than 95% cleaned from tile following application to the tile after 10 minutes drying time by less than 5 cycles of a brush abrasion machine.

14. The method of claim 13, wherein said one or more amine compounds have 3-5 carbon atoms per amine group.

15. The method of claim 14, wherein said one or more amine compounds comprises alkanolamine.

16. A method of grouting tile, comprising the steps of:
    providing a premixed composition, comprising:
    a) a latex resin having a glass transition temperature (Tg) above 25° C.,
    b) a silicone emulsion,
    c) a silane,
    d) one or more amine compounds, and
    e) sand;
    applying the premixed composition in spaces between a plurality of tiles installed on a substrate surface; and
    allowing the premixed composition to dry to cure, wherein said one or more amine compounds have 3-5 carbon atoms per amine group, and wherein said one or more amine compounds comprises a primary amine having a primary amine group attached to a secondary or tertiary carbon atom.

17. The method of claim 13, wherein said one or more amine compounds are 1 wt. %-10 wt. % of dry latex resin weight.

18. A method of grouting tile, comprising the steps of:
    providing a premixed composition, comprising:
    a) a latex resin having a glass transition temperature (Tg) above 25° C.,
    b) a silicone emulsion,
    c) a silane,
    d) one or more amine compounds, and
    e) sand;
    applying the premixed composition in spaces between a plurality of tiles installed on a substrate surface; and
    allowing the premixed composition to dry to cure, wherein said one or more amine compounds are selected from the group consisting of 2-Amino-2-Methyl-1-Propanol, 1-Amino-2-Propanol, 2-Amino-1-Propanol, Cyclopentylamine, 2-Amino-3-methyl-butanol, and combinations thereof.

* * * * *